United States Patent [19]

Udagawa

[11] Patent Number: 4,759,556
[45] Date of Patent: Jul. 26, 1988

[54] METAL GASKET WITH AUXILIARY BEAD

[75] Inventor: Tsunekazu Udagawa, Ichikawa, Japan

[73] Assignee: Ishikawa Gasket Co., Ltd., Tokyo, Japan

[21] Appl. No.: 113,949

[22] Filed: Oct. 27, 1987

[51] Int. Cl.⁴ ............................................. F16J 15/08
[52] U.S. Cl. ................................ 277/235 B; 277/234; 277/236
[58] Field of Search ................... 277/233, 234, 235 R, 277/235 A, 235 B, 236

[56] References Cited

U.S. PATENT DOCUMENTS

| | | | |
|---|---|---|---|
| 1,793,424 | 2/1931 | Fitzgerald | 277/235 B X |
| 1,846,401 | 2/1932 | Oven | 277/235 B X |
| 1,851,948 | 3/1932 | Summers | 277/235 B X |
| 1,903,990 | 4/1933 | Fitzgerald | 277/235 B X |
| 2,092,231 | 9/1937 | Victor | 277/234 |

Primary Examiner—Robert S. Ward
Attorney, Agent, or Firm—Frank J. Jordan; C. Bruce Hamburg; Manabu Kanesaka

[57] ABSTRACT

A metal gasket of the invention comprises at least one metal plate including at least one fluid hole, a main bead extending around and adjacent to the fluid hole, and at least one auxiliary bead situated at an area away from a tightening device of the gasket. The auxiliary bead diverges from a part of the main bead, extends along the main bead and again merges to a part of the main bead. Therefore, an area adjacent the tightening device is sealed by the main bead, and the area away from the tightening device is sealed by the main bead and auxiliary bead to thereby provide equal sealability around the fluid hole when the gasket is tightened.

6 Claims, 2 Drawing Sheets

METAL GASKET WITH AUXILIARY BEAD

BACKGROUND OF THE INVENTION AND RELATED ART STATEMENT

The present invention relates to a metal gasket having a main bead and an auxiliary bead to provide equal sealability around a hole to be sealed.

When a member having a hole therein is sealingly connected to another member having a hole, a gasket is installed between the two members to seal around the hole. Generally, the two members are connected together by a plurality of nuts and bolts passing through the members. In case the distance between the bolts is not so close, when the bolts are tightened, the equal surface pressure is not obtained around the hole. Namely, the sealability at areas adjacent the bolts is different from the sealability at areas away from the bolts.

For example, when a manifold gasket is securely installed between a manifold and a cylinder head by four bolts and nuts, the surface pressure of the manifold gasket around an exhaust hole is not even. Areas adjacent the bolts have high surface pressure, and as the distance from the bolts increases, the surface pressure decreases. As a result, the sealability at areas adjacent the bolts is superior to the sealability at areas away from the bolts.

Also, in a cylinder head gasket, if an oil hole or a water hole is provided at an end portion of a cylinder head gasket away from a tightening bolt, liquid may leak from the oil hole or water hole. This is because sealability around the hole is not even, so that if high pressure is suddenly applied, liquid may leak from the hole.

In order to seal around holes, such as cylinder bores, water holes and oil holes, it was proposed to form a bead on a steel plate to surround the hole. Even if a bead is formed around a hole, however, since a surface pressure on the bead is not even, liquid may still leak from the hole at a portion where the surface pressure of the gasket is not strong.

In this respect, it was proposed that a second bead is formed entirely around a first bead to prevent leakage by two beads. In case the two beads are provided, it is possible to apply strong tightening pressure to the gasket. However, the surface pressure applied onto the gasket or beads is not even. As a result, fluid may still leak at a portion of the gasket having lower surface pressure. Namely, even if two beads are formed around a hole, a low surface pressure portion is partly formed around a hole. Liquid may leak from a lower surface pressure portion of a gasket.

Accordingly, one object of the present invention is to provide a metal gasket, which can provide equal sealability around a hole, when tightened.

Another object of the invention is to provide a metal gasket as stated above, which can securely prevent leakage of fluid around fluid holes of the gasket.

A further object of the invention is to provide a metal gasket as stated above, which can be manufactured easily and economically.

Further objects and advantages of the invention will be apparent from the following description of the invention.

SUMMARY OF THE INVENTION

A metal gasket of the present invention is situated between two members with holes therein, and is held in position by tightening means extending between the members for sealing around the holes.

The gasket comprises at least one metal plate having at least one fluid hole corresponding to the holes of the members, a main bead extending around and adjacent to the fluid hole and at least one auxiliary bead situated at an area away from the tightening means. The auxiliary bead diverges from a part of the main bead, extends along the main bead at a predetermined distance away therefrom and merges again to a part of the main bead. As a result, the area adjacent the tightening means is sealed by the main bead, and the area away from the tightening means is sealed by the main bead and auxiliary bead to thereby provide equal sealability around the fluid hole when the gasket is tightened.

The gasket may be further provided with at least one auxiliary metal plate having at least one fluid hole corresponding to the holes of the members. The auxiliary metal plate is placed adjacent to the metal plate to constitute a steel laminate gasket.

DETAILED DESCRIPTION OF PREFERRED EMBODIMENTS

Figure 1:
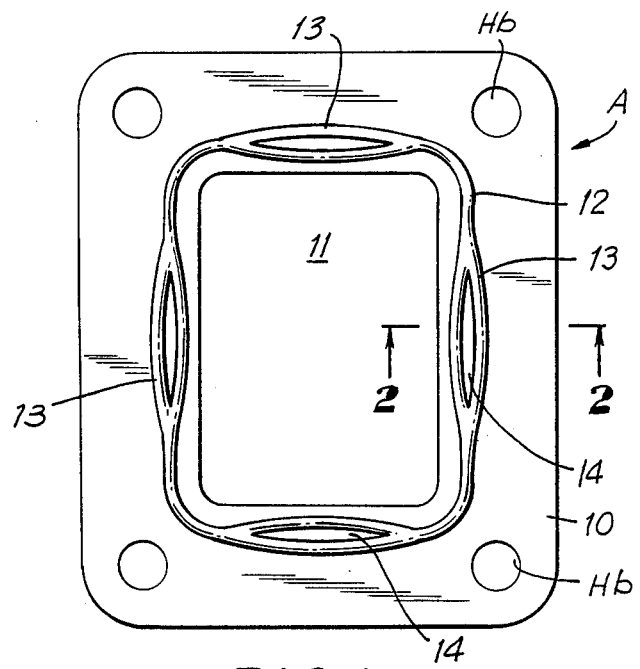
FIG. 1 is a plan view of a first embodiment of a metal gasket in accordance with the present invention, which is designed to be used as a manifold gasket.
Figure 2:
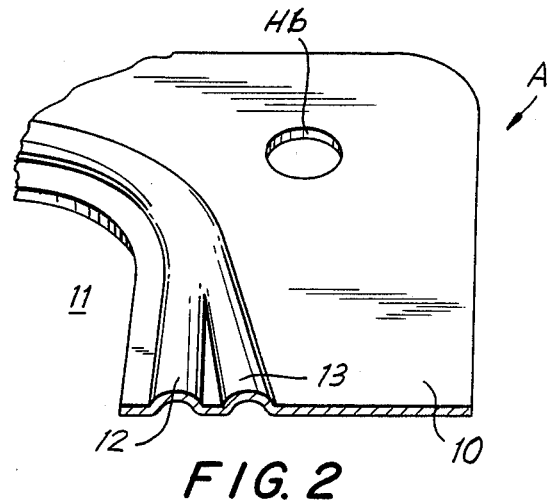
FIG. 2 is an enlarged perspective section view taken along a line 2—2 in FIG. 1.

Referring to FIGS. 1 and 2, a first embodiment A of a metal gasket of the present invention is shown. The gasket A is designed to be installed between a cylinder head (not shown) and a manifold (not shown). The gasket A comprises one metal plate 10 having four bolt holes Hb at corners thereof, and a fluid passage 11 in the center of the plate 10. The gasket A is fixed between the cylinder head and the manifold by nuts (not shown) and bolts (not shown) extending through the bolt holes Hb.

The metal plate 10 is provided with a main bead 12 extending around the fluid passage 11, and four auxiliary beads 13. The respective auxiliary beads 13 are located at middle areas between the adjacent two bolt holes Hb. The auxiliary bead 13 diverges from the main bead 12, extends along the main bead 12 and again merges to the main bead 12. Therefore, an elongated area 14 is formed between the main bead 12 and the auxiliary bead 13.

The width and height of the auxiliary bead 13 are the same as those of the main bead 12. However, the width and height of the auxiliary bead 13 may be different from those of the main bead 12. The width and height of the main bead and auxiliary bead are determined by the shape of the fluid passage, pressure applied to the bead, and so on.

When the gasket A of the present invention is situated and held between the cylinder head and the manifold, the gasket A provides equal sealability. Namely, the corner portions of the main bead 12 receive strong tightening pressure from the tightening bolts and nuts, while the middle areas between the adjacent two bolt holes receive tightening pressure less than that at the corner portions. Therefore, a part of the main bead 12 is located adjacent to the tightening bolt, while a part of the main bead 12 and the auxiliary bead 13 are located at the middle area between the tightening bolts. Accordingly, the part of the main bead 12 and the auxiliary bead 13 can provide substantially the same sealability as that at the corner portion of the main bead 12. The main bead and auxiliary beads, as a whole, can seal evenly around the fluid hole 11.

Figure 3:
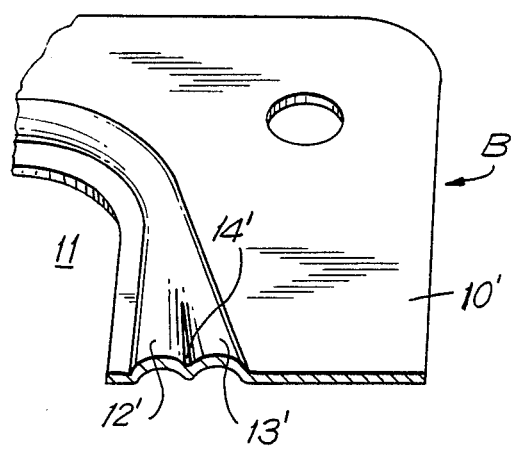
FIG. 3 is a perspective section view similar to FIG. 2, for showing a second embodiment of a metal gasket of the invention.

FIG. 3 shows a second embodiment B of a metal gasket of the present invention. The gasket B comprises a plate 10' with a main bead 12' and an auxiliary bead 13', as in the gasket A. In the gasket B, the auxiliary bead 13' is arranged very close to the main bead 12' so that a narrow area 14' is formed between the main bead 12' and the auxiliary bead 13'. The narrow area 14' does not touch on a surface on which the gasket B is mounted when the gasket is not tightened, while the narrow area 14' holds the tightening pressure on the beads 12', 13' by touching onto the surface when the gasket is tightened. The metal gasket B operates as in the gasket A.

Figure 4:
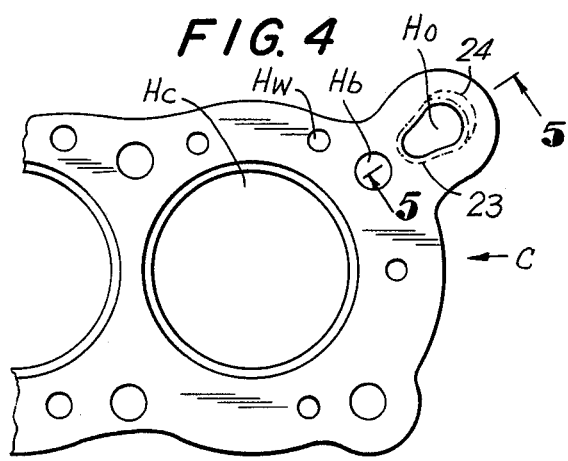
FIG. 4 is a plan view of a part of a third embodiment of a metal gasket of the invention, which is designed to be used as a cylinder head gasket.
Figure 5:
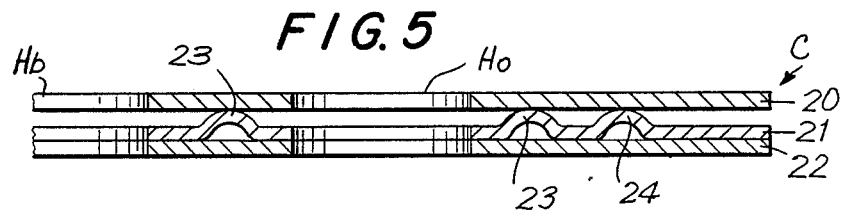
FIG. 5 is an enlarged section view taken along a line 5—5 in FIG. 4.

FIGS. 4 and 5 show a third embodiment C of a gasket of the present invention. The gasket C is designed to be installed between a cylinder head (not shown) and an engine block (not shown). The gasket C comprises an upper plate 20, a middle plate 21 and a lower plate 22 to constitute a steel laminate gasket, and includes a plurality of cylinder bores Hc, water holes Hw, bolt holes Hb, oil holes Ho and so on, as in the conventional gasket.

In the gasket C, the oil hole Ho is located at a corner of the gasket and is substantially tightened by one of bolts (not shown), when installed. In this example, a main bead 23 is formed in the middle plate 21 to surround the oil hole Ho. Further, an auxiliary bead 24 is formed at a portion opposite the bolt hole Hb, which receives less tightening pressure by the bolt.

In the gasket C, a part of the main bead 23 is located at an area close to the bolt, while a part of the main bead 23 and the auxiliary bead are located at an area away from the bolt. Therefore, when the gasket C is located between the cylinder head and the engine block and is tightened, even if the tightened pressure applied to the beads is not even, it is sealed equally around the oil hole.

In the present invention, a main bead is formed around a hole to be sealed. Further, an auxiliary bead is formed at a portion where a tightening pressure is not strong. Accordingly, when the gasket is tightened, it is possible to substantially provide equal sealability entirely around the hole. As a result, leakage of fluid from the hole is substantially prevented.

While the invention has been explained with reference to the specific embodiments of the invention, the explanation is illustrative and the invention is limited only by the appended claims.

What is claimed is:

1. A metal gasket adapted to be situated between two parts with holes therein, said gasket being held in position by tightening means extending between the parts for sealing around the holes, comprising:
    at least one metal plate including at least one fluid hole corresponding to the holes of the parts, a main bead extending around and adjacent to the fluid hole, and at least one auxiliary bead situated at an area away from the tightening means, said auxiliary bead diverging from a part of the main bead, extending along the main bead at a predetermined distance away therefrom and merging again to a part of the main bead so that an area adjacent the tightening means is sealed by the main bead and the area away from the tightening means is sealed by the main bead and auxiliary bead to thereby provide equal sealability around the fluid hole when the gasket is tightened.

2. A metal gasket according to claim 1, wherein width and height of the auxiliary bead are the same as those of the main bead.

3. A metal gasket according to claim 1, wherein width and height of the auxiliary bead are different from those of the main bead.

4. A metal gasket according to claim 1, wherein in case the main bead extends between two tightening means, the auxiliary bead is formed at a center area between the two tightening means.

5. A metal gasket according to claim 1, wherein in case the hole to be sealed is substantially tightened by one tightening means, the auxiliary bead is formed at an area opposite to the tightening means relative to the hole.

6. A metal gasket according to claim 1, further comprising at least one auxiliary metal plate having at least one fluid hole corresponding to the holes of the parts, said auxiliary metal plate being placed adjacent to the metal plate to constitute a steel laminate gasket.

* * * * *